United States Patent

Jensen

[15] 3,689,890

[45] Sept. 5, 1972

[54] ELECTRONIC REMOTE SUPERVISION AND CONTROL OF STATES AND PROCESSES

[72] Inventor: Leo Anker Jensen, Udsigten 26,, Brabrand, Denmark

[22] Filed: April 20, 1970

[21] Appl. No.: 29,990

[52] U.S. Cl.............340/171 R, 179/2 A, 340/171 PF

[51] Int. Cl...........................H04m 11/00, H04q 9/00

[58] Field of Search..........179/2 R, 2 A, 1 VC, 2 DP; 340/167, 171

[56] References Cited

UNITED STATES PATENTS

| | | | |
|---|---|---|---|
| 3,529,087 | 9/1970 | Kawase et al. | 179/2 A |
| 3,548,102 | 12/1970 | Schaum | 179/2 A |
| 3,308,239 | 3/1967 | Waldman et al. | 179/2 A |
| 3,325,598 | 6/1967 | O'Neill, Jr. | 179/2 A |
| 3,532,822 | 10/1970 | O'Hanlon | 179/2 A |
| 3,551,597 | 12/1970 | Russell | 179/2 A |

*Primary Examiner*—Donald J. Yusko
*Attorney*—Edward F. Levy

[57] ABSTRACT

A remote electronic control device for use with an information transmission system. The system includes means for responding to a calling signal from the control system, such as a telephone call signal, after a predetermined period of time. The system, after this waiting period, is then energized for a predetermined period of time during which time supervisory control signals are supplied to the device to modify or change a process being supervised.

8 Claims, 2 Drawing Figures

INVENTOR
LEO ANKER JENSEN
BY
Edward F. Levy
ATTORNEY

INVENTOR
LEO ANKER JENSEN
BY Edward F. Levy
ATTORNEY

ELECTRONIC REMOTE SUPERVISION AND CONTROL OF STATES AND PROCESSES

BACKGROUND OF THE INVENTION

This invention is related to an electric device, in particular such device for remote supervision and remote control of processes and/or states (physical, chemical, electrical, etc.) e.g., via a public telephone network or by means of a wireless communication between the supervisors's station and the station of the supervised object.

It is known for supervision purposes to use such an electric device in connection with a public telephone network with automatic telephone exchanges, utilizing in said device the difference between the pulling voltage and the somewhat lower release voltage of an ordinary electromagnetic relay.

Electric devices are also known in which by means of special networks, e.g., via a high tension network, processes may be controlled at great distances, for instance one or a number of unmanned electric substantions may be controlled by operators or supervisors at an electric power station. "Operators" and "supervisors" may be human beings or devices according to choice.

A common feature of the above-mentioned electric devices is that they utilize electro-mechanically operative contact means for closing and breaking circuits, and accordingly they have inherent disadvantages for use in process controlling, e.g., limited period of life, bulkiness, sensitivity of physical conditions (moisture, vibrations, orientation in comparison with the vertical direction, etc.), danger of explosions. The latter for instance includes the supervision and controlling of a considerable number of chemical processes in which highly explosive solvents are employed.

In British Pat. No. 1, 150, 430 to Agfa-Gevaert Aktiengesellschaft, an electric device is described for supervision purposes, namely a device for listening-in noises in a room, for example to enable a parent to listen-in to a child's room by means of a microphone fitted in the aforesaid room. This device is partially electronic and designed to cooperate with a telephone network in such a manner, that a supervisor by transmitting a ringing signal to the device (i.e., by "calling" or "ringing up" the telephone number in question) is able to switch in a microphone into the telephone circuit.

This known device is provided with mechanically and electromechanically operated contacts and switches, and comprises quite a number of components, and it may not without essential additions be used for the controlling of processes or the changing of states. A further disadvantage is that the said known device demands, in addition to the connection to the telephone network, a connection to a special source of electric current.

It is the object of this present invention to provide an improved electric device of the above-mentioned type, and which is, preferably, suitable for use with a simple and fully electronic controlling unit. Such a unit may be added to the device to make it possible, in the same telephone call as is used for the purpose of supervision, also to modify or change an ascertained development of a process or an ascertained state.

This in accordance with the invention is achieved by a device comprising an electronic contact or switching means designed for answering a call after receipt of a predetermined amount of calling signal or a predetermined number of standardized calling signals, and at the same time designed for holding the line for a predetermined length of time.

The electronic contact or switching means is much safer in action, cheaper, less bulky, unsusceptible to external conditions, has a longer life than prior art mechanical contact means, and the formation of sparks and the consequent danger of explosion is out of question. By requiring the summing up of a certain amount of calling signal (in an ordinary automatic telephone network this means the same as a stipulated number of calling signals, the calling signals in this case being standardized as to their voltage and duration) the device is barred from answering accidental and fortuitous signals received from the telephone network, and a "wrong connection" will be registered by the caller as "no answer" because a certain amount of time will lapse before the device will answer the call.

The number of switching or coupling components may be reduced and the connections in the device may be simplified if in accordance with the invention the device is so designed, that the predetermined or stipulated amount of calling signal corresponding to the predetermined or stipulated number of calling signals for obtaining an answer and the length of time in which the connection is held is completely or partially controlled by one and the same set of coupling means. A set of coupling means may be one or a number of components.

A particularly simple design of the device is achieved by arranging that the electronic contact is completely or partially controlled, directly or indirectly, by means of said set of coupling members.

An appropriate embodiment of the "answering" or "transmitting" portion of the device in such a way, that the member or unit measuring or counting the calling signals and controlling the length of time in which the line is to be held comprises a component which ("ascending") undergoes a change of state in step with each calling signal received, and which during the length of time in which the connection is held undergoes a change of state in the opposite ("descending") direction.

In a preferred embodiment the device is so designed, that the changes in potential difference of the electronic contact caused by the state of the contact are utilized for — by means of a feed-back cascade effect— accelerating the changes of state of the contact to obtain instantaneous opening and closing of the contact. Accordingly slow switching in or breaking of the circuit, which might otherwise falsify a supervisory signal received, is avoided.

In a device in connection with a telephone network with central battery supply the device according to the invention may be arranged to receive all necessary energy, for switching as well as for supervision, from the telephone network with an extremely small circuit loop consumption.

This means a practical simplification, and generally the telephone companies will not complain about the consumption of energy in electronic devices in accordance with the invention demanding only a very small circuit loop consumption in order to maintain a desired polarity on the electronic components of the device.

In case the device is desired to serve for process control or similar purposes, the device is preferably so designed, that a predetermined signal from a caller will produce in one or a number of members of the device a change of state which may be utilized to cause a change in course of a process.

DETAILED DESCRIPTION

Figure 1:
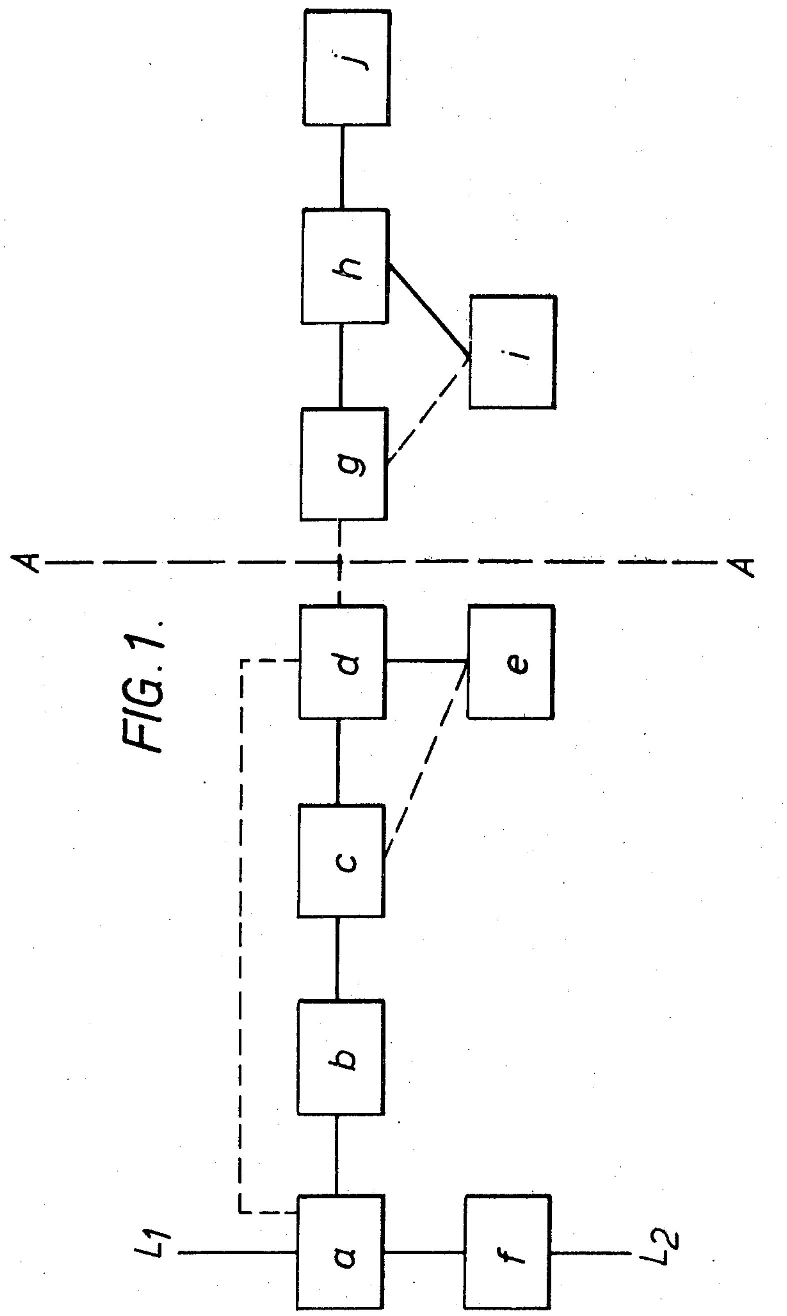
FIG. 1 is a block diagram of a device according to the invention.

In the block diagram in FIG. 1 $L_1$ and $L_2$ are wires for connection between a telephone exchange and the device. The two telephone wires are connected in series through an input circuit *a* and transmitter circuit *f*. The input circuit *a* serves the purpose of securing a desired polarity in a number of components of the device.

The input circuit *a* is connected to the input of a signal checking circuit *b* checking whether or not calling signals are transmitted to the device. The output of checking circuit *b* is connected to the input of a measuring (metering, guaging) or counting unit *c* measuring the amount of signal or counting the number of standardized calling signals and reacting upon receipt of a predetermined amount or number.

The output of measuring or counting unit *c* is connected to the input of and controls an electronic contact *d* closing and breaking the circuit of the telephone line. A time relay *e* is included in the device connected between the measuring or counting unit *c* and the electronic contact *d*. This time relay serves to control the length of time in which the device should be connected with the caller. The connection between the time relay *e* and the measuring or counting unit *c* may be dispensed with, but as will be evident by the following, this connection contributes to the simplification of the device.

The above-mentioned transmitter unit *f* serves for transmitting a signal related to a course of process or a state.

In cooperation with the device described above, i.e., what is shown to the left of a dotted line A—A in the block diagram—a process controlling device is capable of being beneficially used such as shown in the block diagram to the right of the dotted line A—A. To this end, the electronic contact *d* is connected with an identification circuit *g* serving for identification of a signal dispatched by the supervisor for changing the course of a process and subsequently—if the signal proves to be "correct", for forwarding this signal. The identified (checked) and forwarded signal is supplied to a contact circuit *h* controlled by a combined source of power and measuring circuit *i*, which is able to receive its supply of energy as well as its measuring impulse from the identification circuit *g*. The current released by the contact circuit is then supplied to a manipulation unit *j*, which in turn will cause the desired change of the course of the process.

Figure 2:
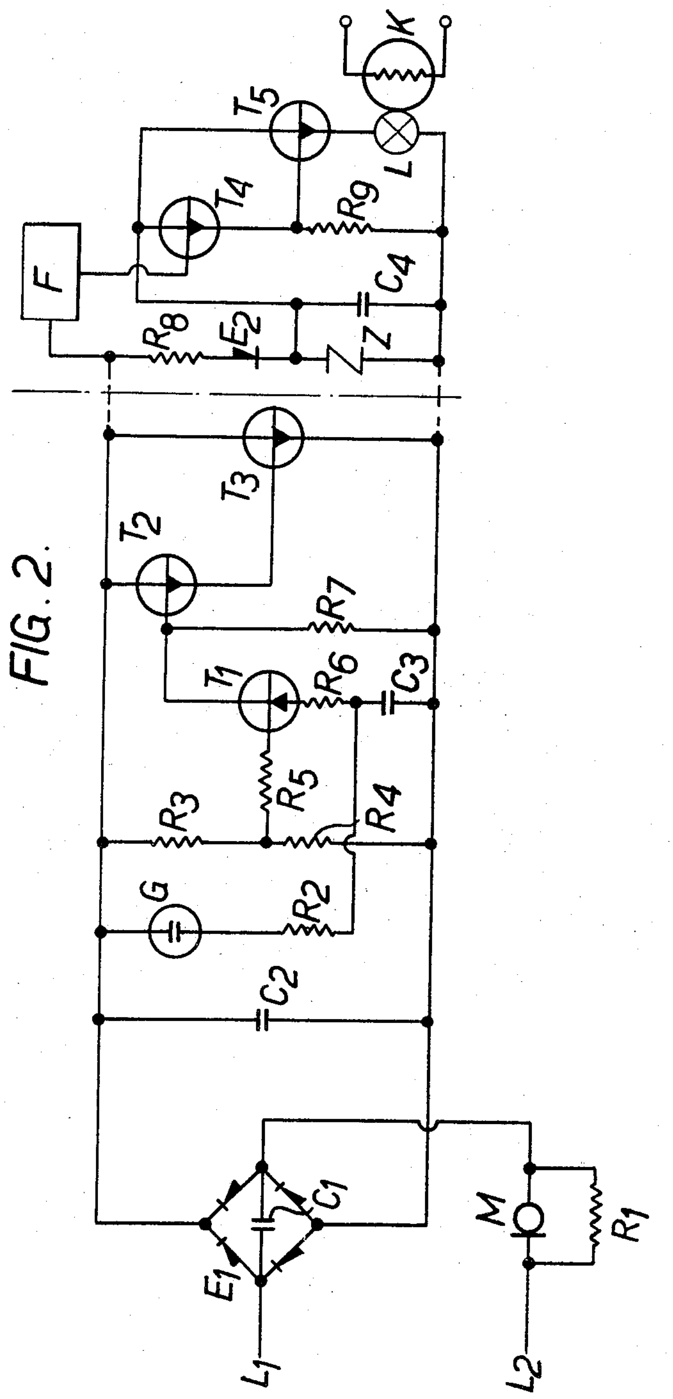
FIG. 2 is a schematic diagram of the device.

The input circuit *a* may be a Graetz bridge as shown in FIG. 2.

The signal checking circuit *b* may comprise a component blocking the flow of the closed loop current and voltage, but freely admitting through current when the telephone line voltage exceeds the closed circuit voltage to a certain extent, such component being, for example, a glow discharge lamp or a zener diode, or it may be a component barring the passage of direct current and allowing an alternating current to pass through, such as a condenser or a transformer.

The measuring or counting unit *c* may comprise or consist of a component capable of changing its own state or causing a change of state in an affiliated component, such as a capacitor including a transistor trigger, by charging the first mentioned component up to a certain threshold value.

The electronic contact *d* intended for closing and opening (the closed circuit voltage) for passage of a current of suitable amplitude may consist of or comprise one or a number of thyristors or transistors.

The time relay *e* may completely or partially consist of the measuring or counting unit, only energized in one or the opposite of its states.

The transmitter unit *f* may be a signal generator, the frequency of which is controlled by the process supervised and, for instance, may be a carbon microphone by means of which the supervisor is able to listen-in to one or a number of characteristic sounds of a process.

Identification circuit *g* may be a tuned selective circuit through which only specific and identifiable signals may pass, thus insuring against unauthorized intervention in the course of a process.

Contact circuit *h* intended to be used for starting or stopping a machine or an apparatus may be a photoelectric resistance influenced by means of a lamp included in the device, and the photo resistance accordingly, when the corrent signal passes through the identification circuit *g* opening the contact circuit *h* will, as a result of the light from the lamp, change resistance, for instance, from 10 megohm to 300 ohms.

The measuring circuit and source of circuit *i* may be a voltaic element or battery (more specially an electric accumulator) or a condensor with great capacity, which after being charged in one direction for a certain length of time will be able to provide a sufficiently large volume of current for a device such as a lamp which controls the contact circuit *h*.

The manipulation circuit *j* may be an electromotor, a brake lifting electromagnet, a buzzer, an electric lamp, an electric heating element or another for the change of course in a process member suitably responsive thereto.

In the schematic diagram in FIG. 2, $E_1$ is a Graetz bridge diagonally crossed by a smoothing condenser $C_1$ (an example of associated component values will be shown in the following table).

$C_{1-4}$ are condensors with different capacities. $R_{1-9}$ are resistances of different sizes. $T_1$ is a transistor of the PNP-type and $T_{2-5}$ are transistors of the NPN-type.

$E_2$ is a silicon rectifier. F is a filter allowing the through passage of a signal tuned to one particular frequency only. G is a glow discharge lamp.

K is a photo-electric resistance in cooperation with a lamp L.

M is a carbon microphone. Z is a zener diode.

During use of the device the wires $L_1$ and $L_2$ are connected to a telephone network including a telephone exchange in a central distribution system.

The close circuit current through the device from $L_1$ to $L_2$ shall in view of the components chosen (see numerical values in the table) at approximately 50 volts of potential be approximately 0.2 mA, thus far below the 10 20 mA required for energizing the relay at the exchange.

The Graetz bridge $E_1$ is a diode bridge having four branches including first and second diodes and third and fourth diodes connected in the same direction with the first and second forming two branches parallel to the third and fourth branches. A smoothing capacitor $C_1$ is connected between the middle two nodes at intersection points of the diode bridge. The bridge $E_1$ provides for positive polarity at the top of the wiring diagram and negative polarity at the bottom of the diagram. One line $L_1$ of the telephone line is connected to one side of capacitor $C_1$ while the other side of capacitor $C_1$ is connected to one side of a microphone M, the other side of which is connected to telephone line $L_2$. A shunting resistor $R_1$ is connected across microphone M. The orientation of the diodes in diode bridge $E_1$ prevents feedback to the microphone M. Resistor $R_1$ safeguards the passage of the closed loop circuit current passing from lines $L_1$ to $L_2$ even if the carbon granules of the microphone would be so disadvantageously deposited that the connection therethrough would be practically interrupted. A certain small amplitude of closed loop current is required to insure the correct polarization of the electronic circuitry utilized and described below.

When a call is received over the telephone lines, a number of alternating current signals at approximately 100 volts will be received by the diode bridge. As described above, normally the diode bridge provides a 50 volt potential to the following electronic circuitry at approximately 0.2 mA. Before describing the change in circuit operation due to the reception of outside calls, the circuitry utilized herein will be set forth. A capacitor $C_2$ which serves to smooth the signal provided by the diode bridge is connected in parallel from the top to the bottom of the bridge. The top of bridge $E_1$ is connected to one side of a glow discharge lamp G, the other side of which is connected through a resistor $R_2$ to a connection point between one side of a capacitor $C_3$ and one side of a resistor $R_6$. Glow discharge lamp G is illustrative of an electronic device which prevents the flow of current until a predetermined voltage level is reached which breaks down the lamp permitting passage of current therethrough. When glow discharge lamp G breaks down, current will flow through resistor $R_2$ and capacitor $C_3$ charging the capacitor since the other side of the capacitor $C_3$ is connected to the bottom of Graetz bridge $E_1$. The other side of resistor $R_6$ is connected to the emitter of a PNP-type transistor $T_1$. A voltage divider is formed by resistors $R_3$ and $R_4$ connected in series and between the top and bottom of diode bridge $E_1$. Resistor $R_5$ is connected between the connection of resistors $R_3$ and $R_4$ and the base of transistor $T_1$. The collector of transistor $T_1$ is connected to the base of NPN-type transistor $T_2$, the collector of which is connected to the top of diode bridge $E_1$. The emitter of transistor $T_1$ is connected to the base of an emitter follower NPN-type transistor $T_3$, the collector of which is also connected to the top of diode bridge $E_1$, while the emitter is connected to the bottom of diode bridge $E_1$.

Prior to glow discharge lamp G breaking down, the voltage provided by the divider network, comprising $R_3$ and $R_4$, to the base of transistor $T_1$ maintains it in a back-biased or OFF state. Therefore, transistors $T_2$ and $T_3$ similarly are in an OFF state. When an outside call is received, the 100 volts provided thereby is superimposed upon the 50 volt closed loop circuit voltage appearing between the top and bottom of diode bridge $E_1$ and causes glow discharge lamp G to break down permitting the passage of current therethrough. Capacitor $C_3$ is charged to a predetermined voltage level which causes transistor $T_1$ to become forward-biased and turned ON. The values of resistor $R_2$ and $C_3$ will determine the waiting period or delay time prior to activation of transistor $T_1$. Such time delay may be chosen in accordance with suitable design considerations and may be long enough to prevent the inadvertent caller from getting a response. The turning ON of transistor $T_1$ causes transistors $T_2$ and $T_3$ to also turn ON. When the transistor $T_3$ is in its conducting or ON state, the voltage from the top to the bottom of diode bridge $E_1$ is quickly diminished, thereby augmenting the turning ON of transistor $T_1$ by dropping the voltage appearing across divider network $R_3$ and $R_4$. This serves to accelerate the turning ON of transistor $T_1$ which provides for more accurate operation of the electronic control device of the present invention.

As the capacitor $C_3$ discharges through transistor $T_1$, the voltage level provided by capacitor $C_3$ drops and reaches a point where transistor $T_1$ again becomes back-biased, thereby switching into its OFF state. Simultaneously, transistors $T_2$ and $T_3$ are switched into their OFF states, thereby increasing the voltage appearing across the divider formed by $R_3$ and $R_4$ to accelerate the switching OFF of transistor $T_1$.

During the period in which the electronic control device of the present invention is connected with the telephone line, a current will flow through the microphone, the resistance of which will vary in step with probable sound waves nearby, as $C_1$ will allow the passage of microphone signals without causing any short circuit between the two wires $L_1$ and $L_2$ of the telephone line.

If the "state" or "situation" to which the caller is listening in (i.e., listening or in any other way sensing) via the microphone gives rise to desire a change of course in a process or a state, he can (the supervisor) dispatch a tone with a stipulated and identifiable frequency while the device is still connected to the telephone line, e.g., by means of a signal generator or simply by whistling a tuned whistle into his (the supervisors's) microphone.

A filter F is tuned to a predetermined frequency and will pass such a signal by means of a connection from the top of diode bridge $E_1$to the input of filter F. The output of filter F is connected to the base of an NPN-type transistor $T_4$while the emitter is connected through a resistor $R_9$to the bottom of diode bridge $E_1$. The collector of transistor $T_4$ is connected to the collector of an NPN transistor $T_5$ while the emitter of transistor $T_5$ is connected through a light source or lamp L to the diode bridge $E_1$. Transistors $T_4$ and $T_5$ serve to amplify the output of filter F. A voltage protection circuit is provided to prevent the large 100 volt signal supplied when an outside call is received from breaking down transistors $T_4$ and $T_5$. In particular, the top of diode bridge $E_1$ is connected through a resistor $R_8$ to the anode of a diode $E_2$, the cathode of which is connected to one side of a zener diode Z, to the collectors of transistors $T_4$ and $T_5$ and to one side of a storage capacitor $C_4$. The other side of zener diode Z and capacitor $C_4$ are connected together and to the bottom of diode bridge $E_1$. In this manner, the zener diode limits the voltage appearing at the collectors of transistors $T_4$ and $T_5$, thereby preventing their breakdown.

Light source L controls the value of photoelectric resistor K and normally when transistors $T_4$ and $T_5$ are OFF, the resistance thereof will be high, for example, at a level of 10 megohms. When a tuned signal is received by filter F, the output thereof will cause transistors $T_4$ and $T_5$ to be switched ON, thereby carrying current through lamp device L and correspondingly decreasing the value of photoelectric resistance K, for example, to a level of 300 ohms.

By means of this change in resistance it will be possible to start an appropriate manipulation equipment, the manipulations of which will start the desired change in the process.

The duration of the intervention in the course of the process may be prearranged so that a controlling signal always results in a certain duration of the intervention, or the duration may be determined by means of the duration of the signal (e.g., the duration of the whistling tone), or one may in a first call start an intervention in the course of the process and stop the intervention by means of a following telephone call.

In the following the components applied in the device will be illustrated by example in tabular form.

TABLE

G: glow potential 80 volts, blanking (closing) potential 60 volts

| | |
|---|---|
| $R_1$ = 600 ohm | $C_1$ = 2 microF/300 volts |
| $R_2$ = 43 Kohm | $C_2$ = 2 microF/300 volts |
| $R_3$ = 270 kohm | $C_3$ = 220 microF/16 volts |
| $R_4$ = 68 kohm | $C_4$ = 1200 microF/40 volts |
| $R_5$ = 68 kohm | |
| $R_6$ = 68 kohm | |
| $R_7$ = 68 kohm | |
| $R_8$ = 270 kohm | |
| $R_9$ = 68 kohm | |

I claim:

1. A remote-condition monitoring and control apparatus for use at a subscriber station in conjunction with a preexisting telephone system, said apparatus comprising a Graetz bridge circuit having a pair of input terminals adaptable for connection to a pair of telephone lines from said preexisting telephone system and a pair of output terminals, voltage detecting means connected to said Graetz bridge output terminals for detecting the presence of incoming a.c. call signals from a remote supervisor station on said pair of telephone lines, summing means for counting the number of said incoming call signals connected to the output of said voltage detecting means, condition monitoring means operative to detect a predetermined physical parameter, switching means connected to the output of said summing means and operative in response thereto when the number of said incoming calls exceeds a predetermined number to selectively connect said condition monitoring means to said preexisting telephone lines to simulate answering of a telephone at said subscriber station and to maintain connection with said telephone lines for a predetermined time period, audio frequency detecting means connected to the output of said switching means and operative in response thereto after said simulated answering at said subscriber station to discriminate between audio command signals over said telephone lines by detecting the frequency of said audio command signals emanating from said remote supervisor station, and control signal generator means connected to the output of said audio frequency detecting means operative in response to said detected supervisory audio command signal to produce a supervisory control signal.

2. A remote-condition monitoring and control apparatus as set forth in claim 1 wherein said voltage detecting means comprises a glow discharge lamp connected at one end thereof to one of said Graetz bridge output terminals, said discharge lamp being conductive only when the voltage there across exceeds a predetermined voltage level representing said incoming a.c. call signals.

3. A remote-condition monitoring and control apparatus as set forth in claim 2 wherein said summing means comprises a charging circuit including a first charging resistor connected at one end thereof to the other end of said discharge lamp and a charging capacitor connected in series with said charging resistor, the series arrangement of said discharge lamp, charging resistor and charging capacitor being connected across said Graetz bridge output terminals.

4. A remote condition monitoring and control apparatus as set forth in claim 3 wherein said summing means includes a discharge circuit including a second resistor and said charging capacitor, said discharge circuit having a discharge time constant corresponding to said predetermined time period for which said switching means maintains connection of said condition monitoring means with said telephone lines.

5. A remote condition monitoring and control apparatus as set forth in claim 4 wherein said switching means includes at least one transistor connected to said charging capacitor, said transistor being switched from its OFF to its ON state when the number of incoming call signals exceeds said predetermined number.

6. A remote condition monitoring and control apparatus as set forth in claim 5 including voltage bias means for biasing said transistor into the OFF condition when the number of incoming call signals is less than said predetermined number.

7. A remote condition monitoring and control apparatus as set forth in claim 6 wherein said switching means includes feedback means in circuit between the output of said switching means and said transistor for accelerating the switching of the state of said transistor from the OFF to the ON state.

8. A remote condition monitoring and control apparatus as set forth in claim 6 wherein said audio frequency detecting means comprises an audio filter operative to exclusively pass supervisory audio command signal.

* * * * *